US012003045B2

(12) United States Patent
Lukyanov et al.

(10) Patent No.: US 12,003,045 B2
(45) Date of Patent: Jun. 4, 2024

(54) WIRELESS INTERCONNECT FOR HIGH RATE DATA TRANSFER

(71) Applicant: Samsung Electronics Co., Ltd., Suwon-si (KR)

(72) Inventors: Anton Sergeevich Lukyanov, Moscow (RU); Mikhail Nikolaevich Makurin, Domodedovo (RU)

(73) Assignee: Samsung Electronics Co., Ltd., Suwon-si (KR)

(*) Notice: Subject to any disclaimer, the term of this patent is extended or adjusted under 35 U.S.C. 154(b) by 154 days.

(21) Appl. No.: 17/862,021

(22) Filed: Jul. 11, 2022

(65) Prior Publication Data

US 2023/0123113 A1 Apr. 20, 2023

Related U.S. Application Data

(63) Continuation of application No. PCT/KR2022/009117, filed on Jun. 27, 2022.

(30) Foreign Application Priority Data

Oct. 20, 2021 (RU) ................................ 2021130597

(51) Int. Cl.
*H01Q 9/04* (2006.01)
*H01Q 1/36* (2006.01)
*H01Q 21/06* (2006.01)

(52) U.S. Cl.
CPC ............ *H01Q 9/0421* (2013.01); *H01Q 1/36* (2013.01); *H01Q 21/065* (2013.01)

(58) Field of Classification Search
None
See application file for complete search history.

(56) References Cited

U.S. PATENT DOCUMENTS

| | | | |
|---|---|---|---|
| 4,750,036 | A | 6/1988 | Martinez |
| 5,345,231 | A | 9/1994 | Koo et al. |
| 6,133,871 | A | 10/2000 | Krasner |
| 6,952,573 | B2 | 10/2005 | Schucker et al. |

(Continued)

FOREIGN PATENT DOCUMENTS

| | | | |
|---|---|---|---|
| CN | B7104106 | A | 3/1988 |
| CN | 2172498 | Y | 7/1994 |

(Continued)

OTHER PUBLICATIONS

Russian Notice of Allowance dated Sep. 27, 2022, issued in Russian Patent Application No. 2021130597.

(Continued)

*Primary Examiner* — Anh Q Tran
(74) *Attorney, Agent, or Firm* — Jefferson IP Law, LLP

(57) ABSTRACT

The disclosure refers to a wireless system for high rate data transfer. The technical result consists in high rate data transfer, improved reliability of the wireless data transfer system, as well as reducing its complexity and size. A wireless data transfer system is provided. The wireless data transfer system includes two antenna structures separated from each other by a gap, each antenna structure including a printed circuit board on which at least one antenna is located, wherein dummy elements are located around each of the at least one antenna, each dummy element being connected to a load.

17 Claims, 3 Drawing Sheets

(56) References Cited

U.S. PATENT DOCUMENTS

| | | | |
|---|---|---|---|
| 7,555,053 | B2 | 6/2009 | Trachewsky et al. |
| 7,715,853 | B1 | 5/2010 | Frerking et al. |
| 8,041,227 | B2 | 10/2011 | Holcombe et al. |
| 8,060,032 | B2 | 11/2011 | Yamazaki |
| 8,158,883 | B2 | 4/2012 | Soffer |
| 8,471,779 | B2 | 6/2013 | Mosebrook |
| 8,560,262 | B2 | 10/2013 | Jin et al. |
| 8,606,178 | B2 | 12/2013 | Petrucci et al. |
| 8,665,143 | B2 | 3/2014 | Wu et al. |
| 8,964,684 | B2 | 2/2015 | Kim et al. |
| 8,965,461 | B2 | 2/2015 | Toncich et al. |
| 9,502,478 | B2 | 11/2016 | Park et al. |
| 9,608,337 | B2 | 3/2017 | Lee et al. |
| 9,749,063 | B2 | 8/2017 | Massarella et al. |
| 9,778,114 | B2 | 10/2017 | Honjo et al. |
| 9,807,651 | B2 | 10/2017 | Mujtaba et al. |
| 9,985,346 | B2 | 5/2018 | Baks et al. |
| 9,991,747 | B2 | 6/2018 | Toncich et al. |
| 10,075,964 | B2 | 9/2018 | Homchaudhuri et al. |
| 10,148,012 | B2 | 12/2018 | Wu et al. |
| 10,283,874 | B2 | 5/2019 | Tsuchiya et al. |
| 10,337,924 | B2 | 7/2019 | Honjo et al. |
| 10,340,874 | B2 | 7/2019 | Horita |
| 10,523,181 | B2 | 12/2019 | Ram |
| 10,559,971 | B2 | 2/2020 | Zeine et al. |
| 10,582,457 | B2 | 3/2020 | Kim et al. |
| 10,582,495 | B2 | 3/2020 | Cai et al. |
| 10,720,902 | B2 | 7/2020 | Ram |
| 10,966,314 | B2 | 3/2021 | Woo |
| 11,082,550 | B2 | 8/2021 | Rouaissia et al. |
| 2004/0077347 | A1 | 4/2004 | Lauber et al. |
| 2004/0077389 | A1 | 4/2004 | Jang |
| 2004/0090950 | A1 | 5/2004 | Lauber et al. |
| 2005/0059377 | A1 | 3/2005 | Schucker et al. |
| 2005/0232370 | A1 | 10/2005 | Trachewsky et al. |
| 2006/0185877 | A1 | 8/2006 | Soffer |
| 2009/0086693 | A1 | 4/2009 | Kennedy |
| 2009/0238103 | A1 | 9/2009 | Yamazaki |
| 2009/0286476 | A1 | 11/2009 | Toncich et al. |
| 2009/0289869 | A1 | 11/2009 | Babakhani et al. |
| 2010/0157524 | A1 | 6/2010 | Soffer |
| 2011/0279300 | A1 | 11/2011 | Mosebrook |
| 2011/0313708 | A1 | 12/2011 | Jin et al. |
| 2012/0139795 | A1 | 6/2012 | Choi et al. |
| 2012/0231754 | A1 | 9/2012 | Petrucci et al. |
| 2013/0241798 | A1 | 9/2013 | Lee et al. |
| 2013/0242924 | A1 | 9/2013 | Kim et al. |
| 2013/0267267 | A1 | 10/2013 | Mujtaba et al. |
| 2015/0084011 | A1 | 3/2015 | Park et al. |
| 2015/0280454 | A1 | 10/2015 | Takeda et al. |
| 2015/0380832 | A1 | 12/2015 | Scott et al. |
| 2016/0079683 | A1 | 3/2016 | Lee et al. |
| 2016/0142159 | A1 | 5/2016 | Massarella et al. |
| 2016/0240918 | A1 | 8/2016 | Yoon et al. |
| 2016/0301240 | A1 | 10/2016 | Zeine et al. |
| 2017/0041085 | A1 | 2/2017 | Kwon |
| 2017/0059413 | A1 | 3/2017 | Honjo et al. |
| 2017/0250726 | A1 | 8/2017 | Gundel et al. |
| 2018/0094981 | A1 | 4/2018 | Honjo et al. |
| 2018/0159203 | A1* | 6/2018 | Baks ...................... H01Q 9/045 |
| 2018/0277657 | A1 | 9/2018 | Yang et al. |
| 2018/0337242 | A1 | 11/2018 | Yang et al. |
| 2019/0022394 | A1 | 1/2019 | Fayram et al. |
| 2019/0191393 | A1 | 6/2019 | Kim et al. |
| 2019/0192022 | A1 | 6/2019 | Ram et al. |
| 2019/0229973 | A1 | 7/2019 | Sengupta et al. |
| 2019/0239805 | A1 | 8/2019 | Ram et al. |
| 2019/0379426 | A1 | 12/2019 | Mccormack |
| 2020/0106524 | A1 | 4/2020 | Hamdy |
| 2020/0161744 | A1 | 5/2020 | Baks et al. |
| 2020/0303954 | A1 | 9/2020 | Zeine et al. |
| 2020/0321994 | A1 | 10/2020 | Alam et al. |
| 2021/0011824 | A1 | 1/2021 | Parsons et al. |
| 2021/0144043 | A1 | 5/2021 | Sengupta et al. |
| 2021/0367344 | A1* | 11/2021 | Kimura ................ H01Q 19/005 |
| 2023/0146641 | A1 | 5/2023 | Kim et al. |

FOREIGN PATENT DOCUMENTS

| | | | |
|---|---|---|---|
| CN | 1113250 | C | 7/2003 |
| CN | 1707975 | A | 12/2005 |
| CN | 1853354 | A | 10/2006 |
| CN | 101093254 | A | 12/2007 |
| CN | 201069872 | Y | 6/2008 |
| CN | 101971513 | A | 2/2011 |
| CN | 102027691 | A | 4/2011 |
| CN | 102683802 | A | 9/2012 |
| CN | 103326104 | A | 9/2013 |
| CN | 104283589 | A | 1/2015 |
| CN | 107112970 | A | 8/2017 |
| CN | 207280498 | U | 4/2018 |
| CN | 108139854 | A | 6/2018 |
| CN | 108463163 | A | 8/2018 |
| CN | 208208987 | U | 12/2018 |
| CN | 109690945 | A | 4/2019 |
| CN | 109891748 | A | 6/2019 |
| CN | 110023748 | A | 7/2019 |
| CN | 108141278 | B | 8/2019 |
| CN | 110447087 | A | 11/2019 |
| CN | 110708404 | A | 1/2020 |
| CN | 108702631 | B | 7/2020 |
| CN | 111656821 | A | 9/2020 |
| DE | 2914534 | Y | 6/2007 |
| DE | 10 2015 104 774 | A1 | 10/2015 |
| DE | 10 2016 106 837 | A1 | 10/2017 |
| EP | 0 473 569 | B1 | 4/1995 |
| EP | 1 641 180 | A1 | 3/2006 |
| EP | 2 113 782 | B1 | 12/2011 |
| EP | 2 642 590 | A1 | 9/2013 |
| EP | 3 059 871 | A1 | 8/2016 |
| EP | 1 587 266 | B1 | 11/2018 |
| EP | 2707968 | B1 | 7/2019 |
| EP | 3 709 474 | A2 | 9/2020 |
| EP | 3 796 678 | A1 | 3/2021 |
| EP | 3886259 | A1 | 6/2021 |
| IN | 109414175 | A | 3/2019 |
| JP | 2002-076739 | A | 3/2002 |
| JP | 2005-354660 | A | 12/2005 |
| KR | 10-2005-0118027 | A | 12/2005 |
| KR | 10-2012-0061451 | A | 6/2012 |
| KR | 10-2061620 | B1 | 1/2020 |
| WO | 01/058195 | A1 | 8/2001 |
| WO | 2004/021141 | A2 | 3/2004 |
| WO | 2004/028061 | A2 | 4/2004 |
| WO | 2005/029718 | A1 | 3/2005 |
| WO | 2006/087705 | A2 | 8/2006 |
| WO | 2009/140223 | A1 | 11/2009 |
| WO | 2013/151922 | A1 | 10/2013 |
| WO | 2014/184519 | A1 | 11/2014 |
| WO | 2016/164321 | A1 | 10/2016 |
| WO | 2017/034876 | A1 | 3/2017 |
| WO | 2017/070372 | A1 | 4/2017 |
| WO | 2018/174999 | A1 | 9/2018 |
| WO | 2018/217315 | A1 | 11/2018 |
| WO | 2019/039833 | A1 | 2/2019 |
| WO | 2019/147381 | A1 | 8/2019 |
| WO | 2019/190500 | A1 | 10/2019 |
| WO | 2020/072149 | A1 | 4/2020 |

OTHER PUBLICATIONS

International Search Report and Written Opinion dated Oct. 7, 2022, issued in International Patent Application No. PCT/KR2022/009117.

Abes Turkiya et al., Performance of a New Design Based on Substrate-Integrated Waveguide Slotted Antenna Arrays for Dual-Band Applications, Journal of Communications Software and Systems, vol. 16, No. 2, Jun. 2020.

(56) References Cited

OTHER PUBLICATIONS

Russian Office Action dated May 31, 2022, issued in Russian Patent Application No. 2021130597.

* cited by examiner

WIRELESS INTERCONNECT FOR HIGH RATE DATA TRANSFER

CROSS-REFERENCE TO RELATED APPLICATION(S)

This application is a continuation application, claiming priority under § 365(c), of an International application No. PCT/KR2022/009117, filed on Jun. 27, 2022, which is based on and claims the benefit of a Russian patent application number 2021130597, filed on Oct. 20, 2021, in the Russian Patent Office, the disclosure of which is incorporated by reference herein in its entirety.

FIELD OF THE INVENTION

The disclosure relates to a radio engineering. More particularly, the disclosure relates to a wireless system for high rate data transfer.

BACKGROUND

The currently growing volume of data transmission between various electronic devices demonstrates the need to develop systems for high-speed data transfer with compact size, simple architecture, low losses, high reliability and efficiency, low cost, etc. These requirements are of particular importance for wireless data transfer systems commonly used in various mobile and stationary electronic devices.

Such data transfer systems find their application, inter alia, in communication systems of new and promising data transmission standards, such as 5th generation (5G) (28 gigahertz (GHz)), wireless gigabit (WiGig) (60 GHz), Beyond 5G (60 GHz) and 6th generation (6G) (subterahertz band), wireless systems Long-distance wireless power transmission (LWPT) (24 GHz), vehicle radar systems (24 GHz, 79 GHz), etc.

It is worth noting that the above circumstances are typical not only for data transfer between electronic devices, but also for data transfer between different boards (components) inside such devices.

For communication for the purpose of board to board data transfer in electronic devices, two main approaches are currently used:

1) Galvanic Connection.

Galvanic connections between components to be connected (for example, between printed circuit boards (PCBs)) are subject to damage due to vibration, thermal expansion, mechanical stress, etc. In addition, due to inaccuracy in the assembly process or due to uneven thermal expansion of the components to be connected when heated, the contact pads of the components to be connected may be displaced relative to each other. This leads to a change in the parameters of the radio frequency (RF) transition between the components to be connected and in higher losses, or to a complete inoperability of the resulting connection. Thus, the known technologies demonstrate insufficient reliability and accuracy, especially for applications in RF devices. At the same time, the desire to increase functionality (for example, data transfer rate) per unit volume and mass of equipment dictates an increase in the number of switching leads, a decrease in the length of conductor routes and a decrease in the contact pitch, which again leads to increased requirements for the accuracy and reliability of contacts between components in radio frequency equipment. Thus, due to the disadvantages listed above, galvanic connections do not meet the increasing demands for data transfer rates between components.

2) Wireless Connection.

Wireless connection for data transfer between components within a device can be implemented through radio frequency communication technology (e.g., near-field communication (NFC)), or by optic communication.

Existing NFC communication technologies are characterized by electromagnetic interference problems. To solve this problem, shielding is used, which significantly affects the parameters of the RF transition and leads to an increase in the geometric dimensions of the components, as well as to an increase in noise in the data transmission channel. In addition, such a connection has a low bandwidth. It is also worth noting that the displacement of the NFC coils (transmitting and receiving) relative to each other leads to a change in the transition parameters and, accordingly, a mismatch and a decrease in the efficiency of data transfer.

Optic communication requires alignment of the optical system and line-of-sight between a transmitter and a receiver. In addition, beam control is required, which is not an easy task due to the small size of the receiver relative to the size of the device. Beam control is realized through complex and high-precision mechanical systems, which affects the complexity of manufacturing such systems, as well as their reliability and cost.

A solution in the related art, disclosed in document US 2019/379426 A1, which presents a wireless data transfer system, wherein a transmitter and a receiver are deployed on separate substrates or carriers, that are positioned relative to each other such that, in operation, the antennas of the transmitter/receiver pair are separated by a distance such that, at wavelengths of the transmitter carrier frequency, near-field coupling is obtained. However in this solution, the antenna elements are integrated into integrated circuits that are located on separate boards. This integration of the antenna elements into the microcircuit makes it impossible to promptly make changes to the antenna design so that it meets the required characteristics during mass production.

Document US 2017/250726 A1 discloses a wireless connector including a first communication device and a second communication device. The first communication device is configured to wirelessly transmit a modulated signal comprising a carrier signal modulated with a digital signal. The second communication device is configured to receive the modulated signal. The first and second communication devices are coupled through at least one wired connection that carries a signal used to demodulate the modulated signal. Thus, the presented solution requires at least one galvanic connection to perform demodulation. In addition, in this solution, the antenna elements are integrated into integrated circuits, which are located on separate boards.

U.S. Pat. No. 8,041,227 B2 discloses a communication device having optical and near-field communication capability. The device includes an optical transceiver circuit fabricated on an integrated circuit die and configured to transmit and receive far field signals. A near field transceiver circuit is also fabricated on the integrated circuit die and is configured to transmit and receive near-field electro-magnetic signals. Control circuitry is provided to selectively allow the optical transceiver circuit and the near field transceiver circuit responsive to an external control signal. However, the infrared (IR) data transmission system used in this solution has an insufficient data transfer rate. In addition, for the implementation of interaction, this solution requires an additional RF channel for coupling the devices.

The solution disclosed in document US 2009/289869 A1 is an antenna structure for coupling electromagnetic energy between a chip and an off-chip element, including a first resonant structure disposed on or in a chip. The first resonant structure is configured to have a first resonant frequency. The antenna structure also includes a second resonant structure disposed on or in an off-chip element. The second resonant structure is configured to have a second resonant frequency substantially the same as the first resonant frequency. The first resonant structure and the second resonant structure are mutually disposed within a near field distance of each other to form a coupled antenna structure that is configured to couple electromagnetic energy between the chip and the off-chip element. The electromagnetic energy has a selected wavelength in a wavelength range from microwave to sub-millimeter wave. However, this solution has a narrow transmission band and does not support operation at millimeter and sub-terahertz wavelengths.

Thus, the existing solutions have a number of disadvantages, the main ones of which are:

low rate data transfer, low reliability, complex structure and/or high level of interference.

Therefore, there is currently a need for a compact, reliable, simple and cheap wireless system that provides high rate data transfer between components of electronic devices.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address at least the above-mentioned problems and/or disadvantages and to provide at least the advantages described below. Accordingly, an aspect of the disclosure is to provide a wireless system for high rate data transfer.

Additional aspects will be set forth in part in the description which follows and, in part, will be apparent from the description, or may be learned by practice of the presented embodiments.

In accordance with an aspect of the disclosure, a wireless data transfer system is provided. The wireless data transfer system includes two antenna structures separated from each other by a gap, each antenna structure including a printed circuit board on which at least one antenna is located, wherein dummy elements are located around each of the at least one antenna, each dummy element being connected to a load.

In yet another embodiment, the antenna is an antenna array consisting of similar antenna elements.

In another embodiment of the system, the antenna array consists of four antenna elements arranged in a 2×2 matrix.

In yet another embodiment of the system, the gap is an air gap.

In yet another embodiment of the system, the air gap between the printed circuit boards is greater than half the wavelength of the signal with the minimum frequency of the operating frequency band.

In yet another embodiment of the system, the load is a microstrip or strip line.

According to another embodiment of the system, the line has a curved shape.

In another embodiment of the system, the line shape is selected from a spiral shape, a meander shape, or some combination thereof.

In another embodiment of the system, the end of the micro strip line is short-circuited by VIA (plated through hole).

According to another embodiment of the system, the load is located on the inner layer of the printed circuit board.

According to another embodiment of the system, the loading is made on lumped elements and elements of a printed circuit board topology.

According to another embodiment of the system, the characteristics of the dummy elements are the same as those of the antenna elements.

According to another embodiment of the system, the dummy elements are identical to the antenna elements.

In another embodiment of the system, the antenna elements are patch antennas.

According to another embodiment, the signal to and from the antenna elements in the antenna structure is transmitted via a port, the antenna elements being connected to the port by means of a line serving as a signal divider in the case of a transmitting antenna structure or as a signal adder in the case of a receiving antenna structure, wherein the line, serving as a signal divider, provides equal and in-phase power division of the electromagnetic signal transmitted to the antenna elements, and the line serving as a signal adder provides in-phase power addition of the electromagnetic signals received from the antenna elements.

The disclosure provides a high rate data transfer while improving reliability and efficiency of a wireless data transfer system having a simple architecture and compact size.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2A depicts a top view of one of the antenna structures of the wireless data transfer system according to an embodiment of the disclosure;

FIG. 2B depicts a cross-sectional side view of the wireless data transfer system according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalent.

It is to be understood that the singular forms "a," "an," and "the" include plural referents unless the context clearly dictates otherwise. Thus, for example, reference to "a component surface" includes reference to one or more of such surfaces.

A wireless data transfer system comprises two antenna structures, separated from each other by a gap and facing each other. The antenna structures perform the functions of transmitting and receiving data, have the same design and in the process of operation can repeatedly change roles, since the direction of data transfer in the system can be reversed.

In a preferred embodiment of the disclosure, the gap separating the antenna structures from each other is an air gap. In alternative embodiments, the gap can be filled with a layer of dielectric or filled with a compound Filling the gap with a layer of dielectric or filling it with a compound can be advantageous in terms of providing mechanical strength and protection against moisture and contamination. In addition, a metamaterial may be located in the gap to enhance and direct the propagation of the field. A combination of the above-mentioned variants for filling the gap between the antenna structures is also possible.

Next, according to an embodiment, the design of the signal transmission antenna structure in a wireless communication system will be described in more detail. However, the above description is also true for the receiving antenna structure, given the fact that the same antenna structure at different times can transmit or receive a signal.

Figure 1:
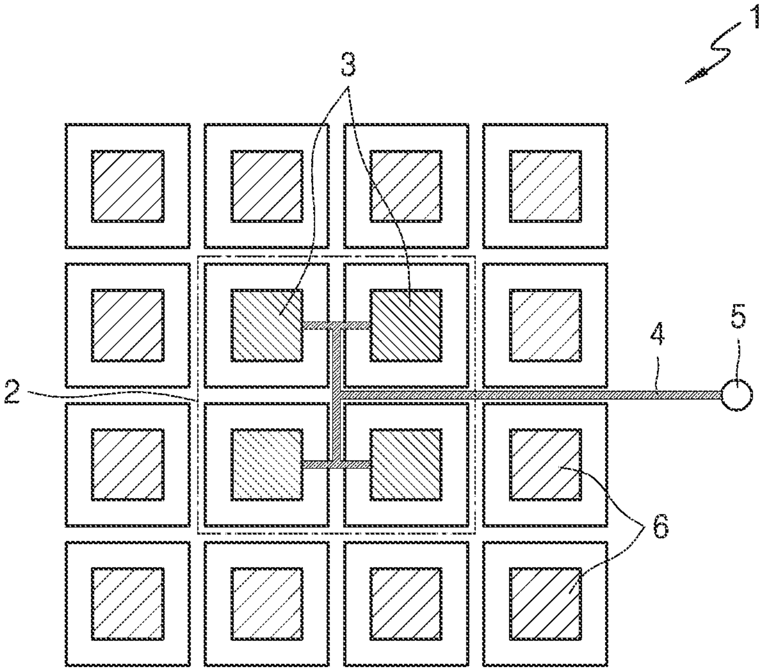
FIG. 1 schematically depicts a portion of one of the antenna structures of a wireless communication system according to an embodiment of the disclosure.

FIG. 1 schematically depicts a portion of one of the antenna structures of a wireless communication system according to an embodiment of the disclosure.

Referring to FIG. 1, an antenna structure 1 in accordance with an embodiment of the disclosure comprises a printed circuit board on which at least one antenna is disposed. In the embodiment, in FIG. 1, the antenna is an antenna array 2, consisting of four antenna elements 3 arranged in a 2×2 matrix. Antenna elements 3 are patch antennas connected to a port 5, through which the signal to be transmitted arrives via a line that serves as a signal divider 4 (or a signal adder in the case of a reverse signal direction). The port 5, in turn, may be connected to an integrated circuit, such as a Radio frequency integrated circuit (RFIC), which directs a signal through the port to the antenna elements. The signal divider 4 provides equal and in-phase separation of the electromagnetic signal power between the antenna elements 3. Similarly, the signal adder provides in-phase addition of power of the electromagnetic signals supplied from the antenna elements. The electromagnetic field emitted from the antenna elements 3 is summed in phase and forms radiation with a high directivity. Most of the energy of the electromagnetic field is directed from the transmitting antenna structure to the receiving antenna structure, which allows for high rate data transfer and high throughput.

Patch antennas can be of any suitable shape, it is important that they are the same. This is necessary to ensure identical patch antenna performance.

It should be noted that in alternative embodiments, the antenna may comprise a different number of antenna elements arranged differently. In this case, the number and shape of the arrangement of the antenna elements described in the embodiment is preferable, since it provides a high directional factor of the antenna array directional diagram and low signal losses in the divider path. An increase in the number of antenna elements in the antenna array leads to an increase in losses in the divider path, while a decrease in the number of antenna elements in the antenna array worsens the directional pattern of the antenna array.

The implementation of the antenna structure on the printed circuit board reduces the complexity of manufacturing. In addition, in the printed version, the design of the antenna can be easily changed by simply changing the design of the printed circuit board during the manufacturing process.

Figure 2A:
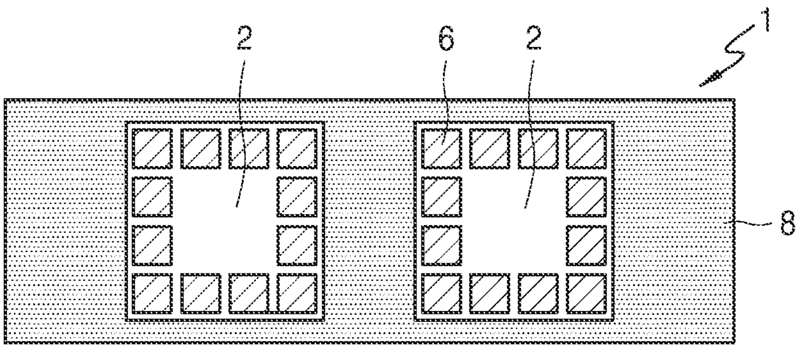
FIGS. 2A and 2B schematically depict an embodiment of a wireless communication system according to an embodiment of the disclosure.
Figure 2B:
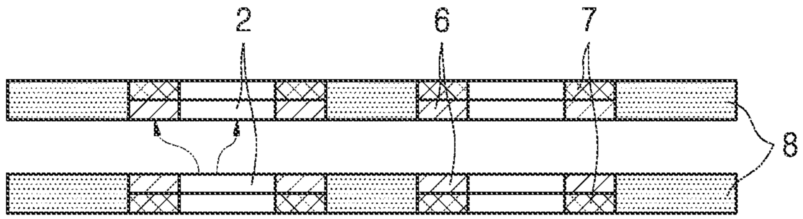

FIGS. 2A and 2B schematically depict an embodiment of a wireless communication system according to an embodiment of the disclosure.

FIG. 2A is a top view of one of the antenna structures of the wireless data transfer system, and FIG. 2B is a cross-sectional side view of the wireless data transfer system.

Referring to FIGS. 1, 2A, and 2B, dummy elements 6 are located around the antenna array 2. The dummy elements 6 are made in the form of patch elements identical to the antenna elements 3 of the antenna array 2. Such a design of the dummy elements 6 leads to the fact that they have similar operating parameters with the antenna elements 3 of the antenna array 2, and, therefore, they operate in an identical frequency band. It should be noted that the dummy elements 6 prevent the emission of parasitic waves (interference signals) outward into the space between the printed circuit boards and the entry of interference signals from the outside (see FIGS. 2A and 2B).

In an alternative embodiment, the dummy elements 6 may differ in shape from the antenna elements 3 of the antenna array 2. It is necessary to ensure that the characteristics of the dummy elements 6, such as, for example, the operating frequency band, directional pattern and gain, coincide with the characteristics of the antenna elements 3 of the antenna array 2.

The electromagnetic field generated by the transmitting antenna array is divided into a useful signal and an interference signal. The useful signal is transmitted to the receiving antenna array and is received by it. The receiving antenna array receives a clear signal, that allows transfer the data with high rate. The interference signal is transmitted to the dummy elements 6 that receive and absorb the signal. Outer signals are received by the dummy elements 6 too, which prevents the entry of interference signals from the outside. The dummy elements 6 are located at one array step from the antenna elements 3. This allows to design a very compact antenna structure. The dummy elements 6 are connected to the loads 7 integrated into the printed circuit board 8 to ensure the absorption of interference signals.

In a preferred embodiment of the disclosure, the data transfer system includes two antenna structures 1 (see FIG. 2B), separated from each other by an air gap, each antenna structure including at least two antenna arrays 2 described above (see FIG. 2A), dummy elements 6 located around the antenna arrays 2, wherein each dummy element 6 being connected to a load 7 integrated into the printed circuit board 8, and the air gap between the printed circuit boards can be greater than half of the signal wavelength with the minimum operating frequency band. In this case, it is possible to excite the modes of the resonator (Fabry-Perot resonator), formed by the parallel conducting planes of the printed circuit boards of the antennas, at frequencies when the distance between the antennas is a multiple of half the wavelength (or close to that) in the medium between the boards, which leads to a decreased power of the received signal, but the dummy elements 6 effectively eliminate this effect of reducing the received power. In addition, protrusions or spacers can be located in the gap, which are necessary for the assembly of the structure.

Figure 3A:
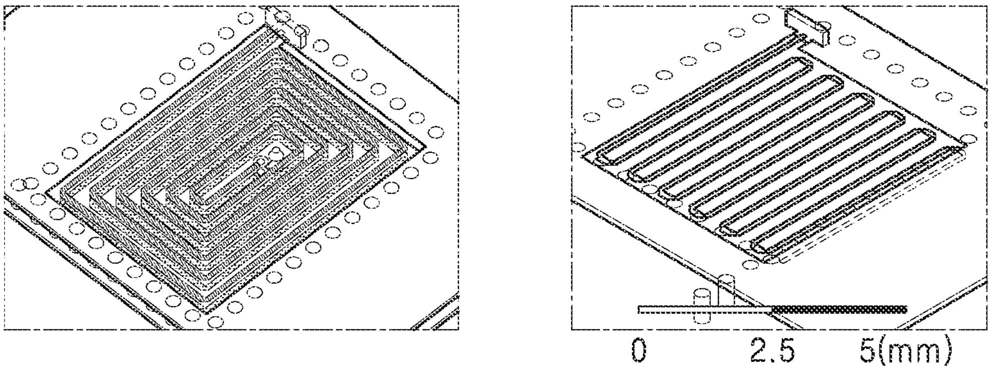
FIG. 3A shows different variants of the shape of the load connected to the dummy element according to an embodiment of the disclosure.
Figure 3B:
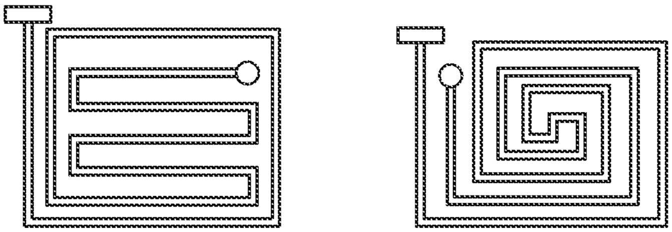
FIG. 3B shows different variants of the shape of the load connected to the dummy element according to an embodiment of the disclosure.

FIGS. 3A and 3B show different variants of the shape of the load connected to the dummy element according to an embodiment of the disclosure.

Referring to FIGS. 3A and 3B, in an embodiment, the load 7 (attenuator) connected to the dummy element 6 is a microstrip line, the length of which allows the absorption of electromagnetic energy of the interference signal. To save space, the microstrip line can have a curved shape, for example, a spiral shape, a meander shape (see FIG. 3A) or some combination thereof (see FIG. 3B).

Figure 4:
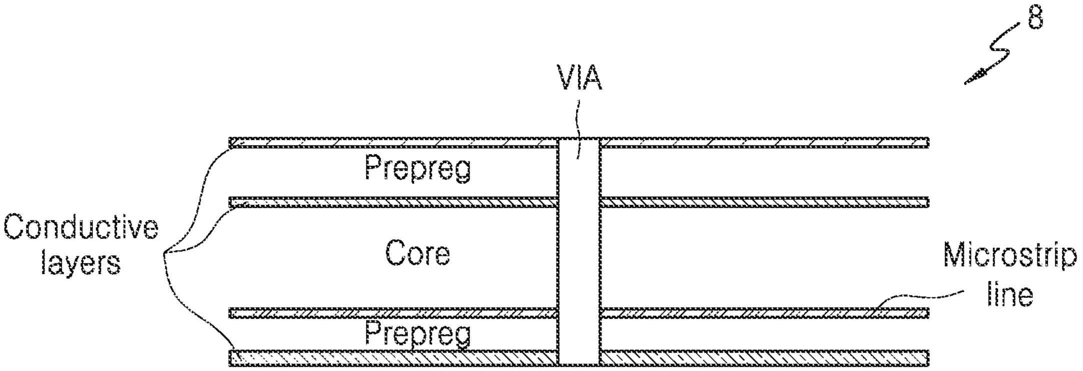
FIG. 4 shows a structure of a printed circuit board in which a load is disposed to be connected to a dummy element according to an embodiment of the disclosure.

FIG. 4 shows a structure of a printed circuit board in which a load is disposed to be connected to a dummy element according to an embodiment of the disclosure.

The microstrip line is located on the inner layer of the printed circuit board 8 (see FIG. 4), which prevents propagation of the interference signal into the outer space. The end of the microstrip line can be short-circuited (i.e., connected to ground) by means of a VIA (plated through hole). The space occupied by the transmission line is surrounded by through VIAs to prevent energy leakage into the volume of the PCB. The electromagnetic field propagating from the port of connection of the microstrip line with the dummy element 6, which receives the interference signal, is gradually absorbed in the microstrip line. Then it is reflected from the shorting VIA back to the port and is additionally absorbed. The reflected electromagnetic field reaching the port is too weak and cannot be radiated from the dummy element 6 to the antenna element 3. This ensures low interference, as well as high rate and data throughput in the useful signal.

As an alternative to the microstrip line, a strip line can be used. It should be noted that the load 7 for the dummy element 6 can be located both symmetrically relative to the thickness of the printed circuit board 8 (i.e., in the middle of the thickness of the printed circuit board), and asymmetrically (i.e., offset relative to the middle of the thickness of the printed circuit board). Here, the location of the strip line depends on the thicknesses of the dielectrics that are used to manufacture the printed circuit board.

The location of the microstrip line on the inner layer of the printed circuit board during the production process avoids the use of complex and costly surface mounted device (SMD) technology for mounting the load for the dummy element, but the load on the SMD elements (or lumped elements) in a number of cases, provides a more compact design of the device.

Thus, in an alternative embodiment, the load can be made in the form of an electrical circuit of lumped elements, for example, resistors in which energy is absorbed, and possibly elements of a printed circuit board topology, for example, quarter-wave line impedance transformers, electrical capacitors, etc.

The use of dummy elements helps to prevent the Fabry-Perot effect between the antenna structures, which can adversely affect other data transfer channels between the antenna structures. Also, the antenna arrays with a high directivity factor reduce the fraction of power radiated into the space between the boards of the device, which further reduces the effect of excitation of the Fabry-Perot resonator mode. The load integrated into the printed circuit board, connected to the dummy element, avoids the installation of additional components to absorb unwanted noise, which reduces the complexity and cost of production, as well as increases reliability of the proposed solution.

It should be noted that in the disclosure, the displacement of the antenna structures (transmitting and receiving) relative to each other by a distance of the order of a wavelength in the operating frequency range is permissible. This displacement does not affect the quality of the connection. This tolerance is more than sufficient for assembling the devices. It is also possible to displace the antennas in the lateral direction, both small, due to the accuracy of the assembly, and constructive, associated with design requirements. In this case, if the antennas are in the far radiation zone, then it is possible to use a power divider and power adder, which generate radiation in the direction of the second antenna. When the distance between the antennas is small, the transmission efficiency is determined by the intersection of the antenna apertures.

The disclosure enables ultra-wideband (bandwidth over 500 megahertz (MHz)) and high-speed wireless communication between printed circuit boards/chips with low noise and low loss.

Thus, the disclosure enables high rate of data transfer to be performed with a compact, reliable, simple and inexpensive data transfer system.

The disclosure can find application in wireless communication systems of $5^{th}$ generation (5G) (28 GHz), WiGig (60 GHz), Beyond 5G (60 GHz) and 6th generation (6G) (sub-terahertz) standards, short-range communication systems (60 GHz, NFC), in wireless data transfer between various modules in modular devices, between components in electronic devices, etc. In addition, the disclosure can be used in surround (360°) vision systems without mechanical rotation.

It should be understood that although terms such as "first," "second," "third" and the like may be used herein to describe various elements, components, regions, layers and/or sections, these elements, components, areas, layers and/or sections should not be limited by these terms. These terms are used only to distinguish one element, component, region, layer or section from another element, component, region, layer or section. Thus, the first element, component, region, layer or section may be called a second element, component, region, layer or section without departing from the scope of the disclosure. As used herein, the term "and/or" includes any and all combinations of one or more of the respective listed positions.

The functionality of an item specified in the description or claims as a single item can be implemented in practice by several components of the device, and vice versa, the functionality of items specified in the description or in the claims as several separate items can be implemented in practice by a single component.

The embodiments of the disclosure are not limited to the embodiments described herein. Basing on the information set forth in the description and knowledge of the prior art, those skilled in the art will appreciate other embodiments of the disclosure which are not apart from the essence and scope of this disclosure.

A person skilled in the art should understand that the essence of the disclosure is not limited to a specific software or hardware implementation. So hardware can be implemented in one or more specialized integrated circuits, digital signal processors, digital signal processing devices, programmable logic devices, user-programmable gate arrays, processors, controllers, microcontrollers, microprocessors, electronic devices, other electronic modules capable of performing the functions described in this document, a computer, or a combination of the above.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless data transfer system comprising:

two antenna structures separated from each other by a gap, each antenna structure including a printed circuit board on which at least one antenna is located, wherein dummy elements are located around each of the at least one antenna, each dummy element being connected to a load.

2. The wireless data transfer system according to claim 1, wherein the antenna is an antenna array consisting of similar antenna elements.

3. The wireless data transfer system according to claim 2, wherein the antenna array consists of four antenna elements arranged in a 2×2 matrix.

4. The wireless data transfer system according to claim 1, wherein the gap is an air gap.

5. The wireless data transfer system according to claim 4, wherein the air gap between the printed circuit boards is greater than half of a wavelength of a signal with a minimum frequency of an operating frequency band.

6. The wireless data transfer system according to claim 1, wherein the load is a microstrip line or a strip line.

7. The wireless data transfer system according to claim 6, wherein the microstrip line or strip line has a curved shape.

8. The wireless data transfer system according to claim 7, wherein a shape of the microstrip line or strip line is selected from a spiral shape, a meander shape, or some combination thereof.

9. The wireless data transfer system according to claim 6, wherein an end of the microstrip line is short-circuited by VIA (plated through hole).

10. The wireless data transfer system according to claim 1, wherein the load is located on an inner layer of the printed circuit board.

11. The wireless data transfer system according to claim 1, wherein the loading is made on lumped elements and elements of a printed circuit board topology.

12. The wireless data transfer system according to claim 2, wherein characteristics of the dummy elements are a same as those of the similar antenna elements.

13. The wireless data transfer system according to claim 12, wherein the dummy elements are identical to the similar antenna elements.

14. The wireless data transfer system according to claim 2, wherein the similar antenna elements are patch antennas.

15. The wireless data transfer system according to claim 2, wherein a signal to and from the similar antenna elements in an antenna structure of the antenna structures is transmitted via a port, the similar antenna elements being connected to the port by means of a line serving as a signal divider in case of a transmitting antenna structure or as a signal adder in case of a receiving antenna structure, wherein the line, serving as the signal divider, provides equal and in-phase power division of an electromagnetic signal transmitted to the similar antenna elements, and wherein the line serving as the signal adder provides in-phase power addition of electromagnetic signals received from the similar antenna elements.

16. The wireless data transfer system according to claim 2, wherein the printed circuit board comprises outer layers of prepeg surrounding an inner core.

17. The wireless data transfer system according to claim 16, wherein the load is a microstrip line located on an inner side of one of the outer layers of prepeg.

* * * * *